US008081180B2

(12) United States Patent
Storti et al.

(10) Patent No.: US 8,081,180 B2
(45) Date of Patent: Dec. 20, 2011

(54) FUNCTION-BASED REPRESENTATION OF N-DIMENSIONAL STRUCTURES

(75) Inventors: Duane W. Storti, Seattle, WA (US); Mark A. Ganter, Edmonds, WA (US)

(73) Assignee: University of Washington, Seattle, WA (US)

( * ) Notice: Subject to any disclaimer, the term of this patent is extended or adjusted under 35 U.S.C. 154(b) by 1037 days.

(21) Appl. No.: 11/941,863

(22) Filed: Nov. 16, 2007

(65) Prior Publication Data
US 2008/0117205 A1 May 22, 2008

Related U.S. Application Data

(60) Provisional application No. 60/859,670, filed on Nov. 17, 2006.

(51) Int. Cl.
G06T 17/00 (2006.01)
G06K 9/00 (2006.01)
(52) U.S. Cl. ......... 345/420; 345/424; 382/128; 382/131
(58) Field of Classification Search .................. 345/420, 345/424; 382/128, 131
See application file for complete search history.

(56) References Cited

U.S. PATENT DOCUMENTS

| 5,390,291 | A  | * | 2/1995  | Ohashi          | 345/419 |
|-----------|----|---|---------|-----------------|---------|
| 6,166,742 | A  | * | 12/2000 | He              | 345/421 |
| 6,441,816 | B1 | * | 8/2002  | Nguyen et al.   | 345/420 |
| 6,973,212 | B2 | * | 12/2005 | Boykov et al.   | 382/173 |
| 7,194,117 | B2 | * | 3/2007  | Kaufman et al.  | 382/128 |
| 2001/0031920 | A1 | * | 10/2001 | Kaufman et al. | 600/431 |
| 2001/0036302 | A1 | * | 11/2001 | Miller         | 382/128 |
| 2002/0090121 | A1 | * | 7/2002  | Schneider et al. | 382/128 |
| 2003/0052875 | A1 | * | 3/2003  | Salomie         | 345/419 |
| 2005/0105786 | A1 | * | 5/2005  | Moreau-Gobard et al. | 382/128 |
| 2005/0128195 | A1 | * | 6/2005  | Houston et al.  | 345/419 |
| 2005/0134587 | A1 | * | 6/2005  | Geiger et al.   | 345/423 |
| 2005/0163356 | A1 | * | 7/2005  | Makram-Ebeid et al. | 382/128 |
| 2005/0196024 | A1 | * | 9/2005  | Kuhnigk         | 382/128 |
| 2005/0219245 | A1 | * | 10/2005 | Tao             | 345/424 |
| 2006/0173272 | A1 | * | 8/2006  | Qing et al.     | 600/407 |
| 2006/0214932 | A1 | * | 9/2006  | Grady et al.    | 345/440 |
| 2006/0235294 | A1 | * | 10/2006 | Florin et al.   | 600/425 |

(Continued)

OTHER PUBLICATIONS

Esteve et al.; Multiresolution for algebraic curves and surfaces using wavelets; Oct. 1998; Universitat Politecnica de Catalunya.*

(Continued)

*Primary Examiner* — Xiao Wu
*Assistant Examiner* — David T Welch
(74) *Attorney, Agent, or Firm* — Christensen O'Connor Johnson Kindness PLLC

(57) ABSTRACT

A method is disclosed for the solid modeling of objects that is particularly suitable to modeling objects obtained from scan data, typically voxel-based data, for example medical imaging data. The method provides a more direct approach to providing solid modeling capabilities in modeling complex objects, such as organic objects, that are identified through a segmentation of the scanned data. The voxel-based data is obtained, and segmented to identify in the data the surface of the object. The segmentation is preferably accomplished using a graph cuts/level set method to obtain a grid of signed distance function data. The signed distance function data is then interpolated using wavelets, to produce a functional representation model of the object. The model does not require tessellation, and may be relatively compact. In particular, the resulting wavelet analysis is inherently amenable to multi-resolution analysis and compaction.

20 Claims, 4 Drawing Sheets

U.S. PATENT DOCUMENTS

| | | | | |
|---|---|---|---|---|
| 2006/0281987 | A1* | 12/2006 | Bartesaghi et al. | 600/410 |
| 2007/0058865 | A1* | 3/2007 | Li et al. | 382/173 |
| 2007/0160277 | A1* | 7/2007 | Slabaugh et al. | 382/128 |
| 2007/0167788 | A1* | 7/2007 | Hartlep et al. | 600/447 |
| 2008/0018646 | A1* | 1/2008 | Farag et al. | 345/424 |
| 2008/0030497 | A1* | 2/2008 | Hu et al. | 345/419 |
| 2008/0152217 | A1* | 6/2008 | Greer | 382/155 |
| 2008/0317308 | A1* | 12/2008 | Wu et al. | 382/128 |

OTHER PUBLICATIONS

Kapur; Model-based three-dimensional medical image segmentation; 1999; Massachusetts Institue of Technology.*

Boykov et al.; Interactive graph cuts for segmentation of objects in N-D Images; Jul. 2001; Siemens Corporate Research.*

Krissian et al.; Fast sub-voxel reinitialization of the distance map for level set methods; Nov. 2003; Harvard Medical School.*

Storti, D.W., et al., "Artifact vs. Anatomy: Dealing With Conflict of Geometric Modeling Descriptions," SAE Technical Paper No. 2007-01-2450, presented at the 2007 Digital Human Modeling Conference: Session: Advanced Measuring Methods/3D Human Modeling, Seattle, Wash., Jun. 2007.

Storti, D.W., et al., "Wavelet SDF-Reps: Solid Modeling With Volumetric Scans," ASME Technical Paper No. DETC2007-34703, Proceedings of the ASME International Design Engineering Technical Conferences (IDETC07), 33rd Design Automation Conference (DAC), Las Vegas, Nev., Sep. 4-7, 2007.

* cited by examiner

FUNCTION-BASED REPRESENTATION OF N-DIMENSIONAL STRUCTURES

CROSS-REFERENCE TO RELATED APPLICATION

This application claims the benefit of U.S. Provisional Application No. 60/859,670, filed Nov. 17, 2006, the disclosure of which is hereby expressly incorporated by reference in its entirety, and priority from the filing date of which is hereby claimed under 35 U.S.C. §119.

BACKGROUND

Recent technological advances have led to adoption of 3D scanning as standard practice in a variety of fields including medical diagnostics and inspection of manufactured parts with very high quality assurance requirements. As a result, it has become easy to generate large quantities of voxel (volume element) data, and advances in graphics software and hardware have made it possible to visualize such data. As used herein, "voxel" is not intended to be restricted to three dimensions only, but rather is defined more generally to mean a volume element in two or more dimensions.

However, things get more complicated when you attempt to do more than visualize the data. Consider for example the scenario wherein a bio-medical device manufacturer develops a catheter device for treating certain cardiac ailments, and they have created a design and demonstrated that it is effective on porcine test specimens. Now "all" that remains to be done is to adjust the design so that it will be effective for treating a particular human patient. The problem is to create a specific catheter design that can navigate through a particular human vascular system so it can be safely inserted from the femoral artery to the heart to provide necessary treatment.

What is needed to effectively and efficiently adjust the design for such human application is a geometric model of the relevant human anatomy that can be directly compared and used with a geometric model of the catheter. Typically, such device models are created using commercial computer-aided design ("CAD") software.

It is at this stage where large barriers currently exist. Commercial CAD models typically consist of mathematical descriptions of a collection of patches (for example, triangular elements or nonuniform rational B-splines) that collectively define a surface of the device or object described by the model. In conventional CAD models, therefore, the catheter discussed above would consist of a set of surface patches. The data describing the relevant anatomical structure as obtained by 3D scanning (e.g., computed tomography, magnetic resonance imaging, positron emission tomography, etc.) is, however, in an entirely different form that is not compatible with conventional CAD models. Medical imaging scanners provide a 3D array of intensity values associated with each volume element. In more traditional form, the scan data can be considered as a stack of 2D images.

Conversion of the voxel-based 3D array of intensity values for use in a conventional CAD model is still a significant problem. Even restricting to a single 2D image from the stack produced by the scanner, the so-called segmentation problem (identification of a region in the image corresponding to a particular anatomical structure) has offered substantial challenges. Restricting further to the relatively easy problem of identifying hard tissue, e.g., locating the interface between bone and surrounding soft tissue, is not as simple as choosing the appropriate intensity contour in the scanned image. The boundary of the bone simply does not correspond to any iso-intensity curve, and more sophisticated methods are required. The good news is that new segmentation algorithms introduced in recent years have achieved significant progress. Colleagues in radiology have successfully combined graph cuts techniques with recent developments in level set methods to produce codes that achieve efficient segmentation of images, for example to identify bones for orthopedic applications. From a high resolution scan, triangulated surface representations of the bones within the scanned volume can be obtained on a conventional workstation in a matter of minutes.

While improvements in solving the segmentation problem is a significant and very useful accomplishment, it does not solve all the associated problems. With 3D scan data, the common practice is to perform segmentation to generate a grid of signed distance data identifying the surface of one or more objects. An iso-surface generator is then used on the signed distance data to derive an approximate tessellation of the surface dividing interior from exterior regions of the objects. The result is either a surface mesh or, if the mesh is properly closed and appropriate topological information is provided to establish connectivity of the surface triangulation, a traditional boundary representation ("b-rep") model. Methods for polygonizing isosurfaces include marching cubes or dividing cubes methods, continuation methods including predictor-corrector methods, and simplicial continuation methods. In real applications, such triangulated models can contain so many triangles that typical solid modeling operations become impractical.

For example, in an ongoing project, we are using 3D printing (rapid prototyping) to fabricate models of anatomical joints from the CAD models derived using a level set algorithm. To preserve the orientation of the bones, pins are inserted into the model to connect the individual bones. However, the final operation of uniting the bone models with the pin models turns out to be troublesome. The computational load associated with constructing the union of conventional CAD models with N triangles is of order $N^2$ (unless specialized pre-processing algorithms, such as bin sorting, are invoked), and as a result the seemingly simple operation of inserting pins to join bone models becomes impractical when the model of each bone is comprised of hundreds of thousands of triangles.

It is also desirable to employ the CAD models of segmented structures as the basis for finite element analyses. However, there are unresolved compatibility issues. The triangles on the surface of one segmented anatomical structure may not match up with the triangles modeling the surface of the adjacent structure, and such mismatches or incompatibilities strongly degrade the accuracy and efficiency of finite element analyses.

The current status is that high resolution scan data descriptions of anatomical structures can be readily obtained, but such descriptions cannot readily be employed in conventional engineering CAD systems for design/simulation tasks beyond visualization. The scan data can be translated into the CAD domain, but the translated descriptions tend to contain a large number of surfaces and are not well-suited to achieving the desired tasks. Such issues are not specific to this example problem but frequently arise in the development of typical biomedical devices and prostheses where fit and/or interference between man-made artifacts and existing anatomy are essential considerations. The biomedical industry, as well as other industries that use voxel-based data describing or imaging complex structures, would benefit from improved tools for device design and development, and society would in turn benefit from enhanced development of biomedical devices.

SUMMARY

A novel method is disclosed for utilizing voxel-based data, for example the intensity data obtained from conventional medical imaging systems, in a system that is amenable to use for CAD operations, without requiring polygonization or tessellation of the data. The method greatly reduces the computational difficulties associated with the very large data sets that typically arise in conventional CAD systems.

In a particular embodiment, a method for modeling geometrically complex objects is disclosed, comprising obtaining voxel-based image data of a region. For purposes of the present disclosure, voxel-based data is defined to include general n-dimensional volume elements, and in an exemplary application the data comprises intensity values obtained by conventional medical imaging technologies such as magnetic resonance imaging, computed tomography, functional MRI, or positron emission tomography. The image data is segmented to produce a grid of signed distance values, wherein the magnitude of the signed distance values represent the nearest distance to the surface of an imaged object, and the sign of the signed distance values indicate whether the associated point in internal or external to the imaged object. A currently preferred segmenting method comprises a graph cuts/level set method.

Wavelets, for example Daubechies wavelets, are then used to interpolate the signed distance values between grid points, to generate a functional representation of the object. The signed distance values and/or the functional representation is stored onto computer readable media. This functional representation is readily amenable to data compaction, such that the size of the model may be significantly reduced, with minimal loss of model resolution.

In an embodiment of the invention, the signed distance values on the grid of points may be operated on directly to perform conventional CAD operations, without tessellation of the object. For example, a second object model may be similarly described using a grid of signed distance values, and the two grids may be operated on to perform an intersections, union or difference.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 4A shows the 128×128 image obtained by raycasting the f-rep at the scanner resolution; FIGS. 4B shows the and 4C show coarser images produced by compressing the data from FIG. 4A, and FIG. 4D shows a finer image produced by expanding the data from FIG. 4A.

DETAILED DESCRIPTION

Figure 1:
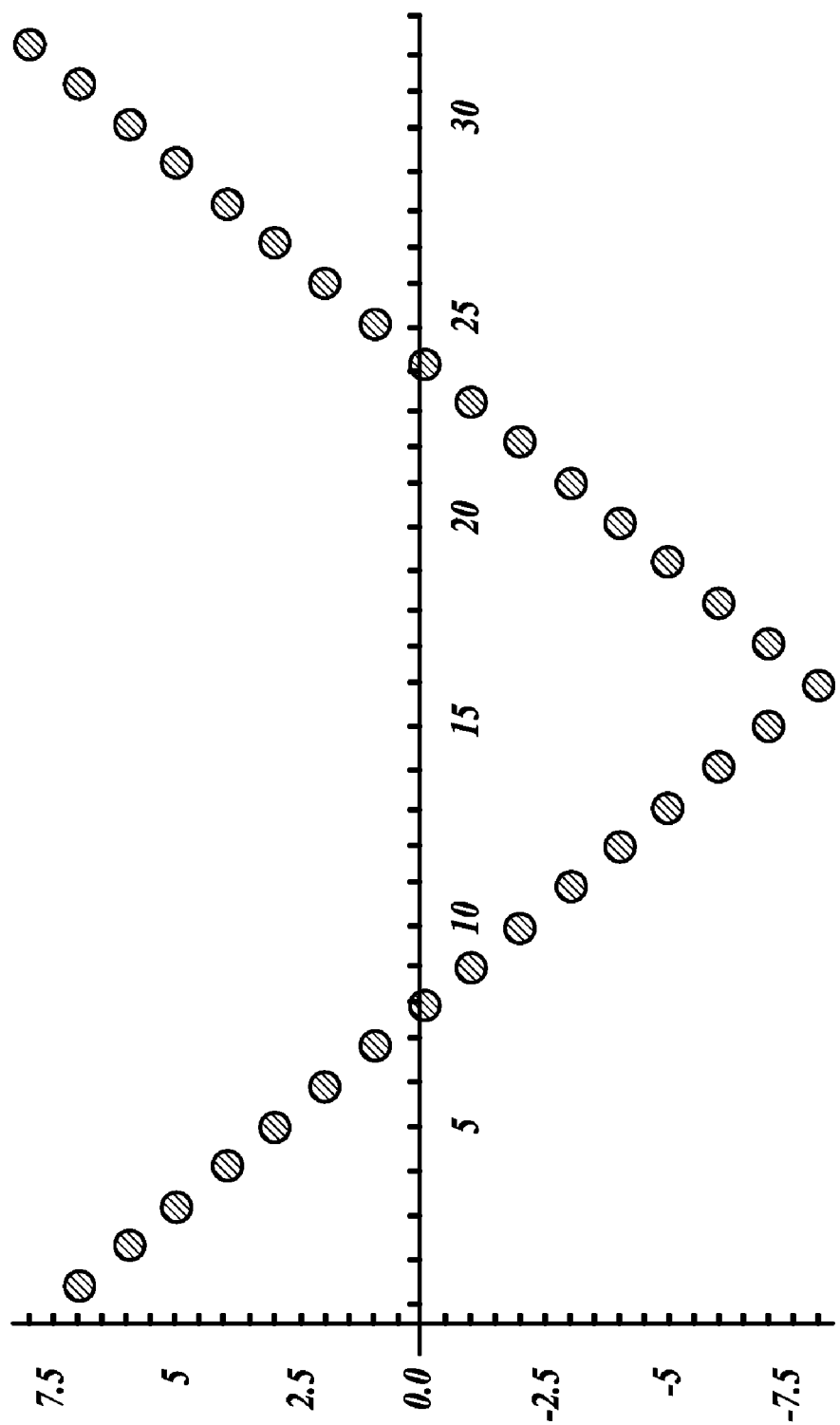
FIG. 1 shows a plot of a one dimensional grid of values constructed by discretely sampling the signed distance function describing the 1D interval [8,24]

The present invention is directed to novel tools for the modeling and analysis of geometrically complex regions or systems, as are commonly encountered for example, in the field of medical device development. To aid in understanding the present invention, we describe invention in terms of biomedical applications, although it will be apparent to persons of skill in the art that the disclosed method may be employed in a wide variety of other applications, including any application wherein imaging systems are used for obtaining voxel-based data. Such applications would benefit from modeling and analysis tools that are based as closely as possible on the voxel-based native data format obtained when imaging a volume containing one or more anatomical structures.

What would such tools look like? Clearly the raw scanner output does not suffice. Something must be done to translate the intensity levels into a useful format, including segmenting the data to identify anatomical structures. Segmentation of such data is exactly the purpose achieved by graph cuts/level set methods. Given the raw intensity data produced by a conventional medical imaging scanner and specification of a seed region contained within the structure of interest, a level set algorithm can produce a revised set of voxel data wherein the new data comprises distance to the boundary of the structure. More precisely, the new data is a grid of signed distance values where (by convention) a negative sign designates a voxel lying in the interior of the structure, as disclosed in detail by the co-pending U.S. patent application Ser. No. 11/608,750, published as U.S. Patent Pub. No. US 2008/0030497 A1, which is hereby incorporated by reference in its entirety.

Can the signed distance data serve as a model of the structure, suitable for manipulation and/or interrogation similar or equivalent to conventional CAD systems? The basic operation that any solid modeling approach must provide is point membership classification: given a point in a relevant space, the model must provide the information needed to determine if the point is inside, outside or on the surface of the structure. The grid of signed distance values automatically classify the points on the grid, but a solid model must also be able to classify points not lying on the grid, so some further extension is required.

The proposed approach is to employ the grid of signed distance values as the basis for creating a function-based representation ("f-rep") of the structure. The basic idea behind f-reps (also know as implicit representations) is that a solid is represented by a function, $f(\vec{r})$ where the vector $\vec{r}$ designates the displacement of the point from a specified datum. A point is classified by evaluating the function at that point. By convention, surface points correspond to $f(\vec{r})=0$, while interior and exterior points correspond to negative and positive values respectively. F-reps of simple solids (spheres, ellipses, cylinders, etc.) arise naturally in introductory classes on calculus and analytic geometry. For example, for the simple example of a sphere the signed distance f-rep is $f_{SDF}(x, y, z) = \sqrt{x^2+y^2+z^2} - r$, but it was long considered impractical to construct f-reps for solids with complexity comparable to typical engineering parts, much less with the complexity of anatomical structures.

In earlier work we established a set of tools for constructing f-reps for engineering objects by analogy with manufacturing operations (cutting, joining, turning, extruding, etc.), wherein the functions include standard algebraic (e.g., addition, multiplication), semi-algebraic (e.g., roots), logical (e.g., max, min) and trigonometric (e.g., sine, cosine, tangent) operations. The conventional wisdom had been that performing even basic operations, such as computing ray-surface intersections which is essential for tasks as fundamental as visualization, are unwieldy on functions containing high degree polynomials, roots, and trigonometric functions. Since these functions have derivatives that are not readily bounded, they have been considered problematic and avoided by the CAD industry.

To produce a useful f-rep for an anatomical structure, we need to be able produce a description of the structure comprised of a function that either has well-behaved derivatives or is composed of elementary functions with well-understood behavior. Just as there is no simple description for how to construct a typical bone with conventional manufacturing processes, there is no obvious constructive approach to producing an f-rep of an anatomical structure using simple algebraic, semi-algebraic, and trigonometric functions. An innovative approach to this problem is disclosed in U.S. Pat. No. 6,100,893. There is also no guarantee that the scanner data is smooth enough to correspond to anything with well-behaved derivatives. However, the signed distance data, as discussed above, does correspond to something with a very well-behaved derivative. Its continuous analog, the signed distance function ("SDF") has a gradient with unit magnitude. The maximum rate of change in function value per unit distance is 1 (when moving directly away from the nearest surface point) or -1 (moving directly toward the nearest surface point) everywhere the derivative exists (i.e., wherever a unique nearest surface point exists). Points where the SDF gradient does not exist lie on the skeleton or medial axis which is itself useful for design purposes.

We disclose a method for interpolating the grid of signed distance data while preserving the necessary "nice" behavior of the derivative. In particular, we employ wavelet analysis to interpolate the signed distance data to obtain an implicit or function-based representation of the object.

In one definition, analysis involves describing complicated functions as linear combinations of basis functions that are simpler or have more known properties. The most well-known version of analysis, Fourier analysis, expresses more general classes of functions as linear combinations of trigonometric functions whose frequencies satisfy a scaling relation (i.e., a whole number of periods of the basis functions coincides with the fundamental period of the function being analyzed).

Wavelet analysis provides a generalization with scaling applied to both frequency and amplitude. Wavelet implementations (e.g., Daubechies wavelets) exist that have the following properties and capabilities:

Simple recursion relations that can be efficiently implemented as basic operations (correlations or convolutions) on lists of given dimension (including 3D data grids) provide the basis for all essential operations including analysis, synthesis, and computation of derivatives;

"Vanishing moments," i.e., exact fits are provided for sampled values of functions that are composed of pieces of polynomials of sufficiently small degree (excluding the neighborhood of singular points);

Natural multi-resolution representation: smaller approximate representations arise naturally from large high-resolution data sets. (Conversely, refined models can be derived automatically from smaller, coarser representations.) Each level of analysis involves identifying the contribution of a "low frequency" component and a set of shifted "high frequency" components. The magnitudes of these components are obtained by list correlation/convolution; and PDE solvers: Algorithms are available for numerical solution of partial differential equations on domains defined by wavelet-based f-reps.

Daubechies wavelets are designed to be compact, such that all operations involve list correlations/convolutions with finite-length coefficient lists.

Initial investigation of wavelet f-reps of anatomical structures have demonstrated the feasibility of basic operations (visualization and Boolean operations) and indicated great promise for data compression.

The specific tasks associated with these general objectives of the present invention include implementation of the basic wavelet representation, implementation of visualization and Boolean operations, providing access to multi-resolution models, implementing methods for interrogation of models and evaluation of integral properties (such as volume, surface area, and moments of inertia), implementation of skeletal editing techniques, and applications of f-reps to collision detection and solution of partial differential equations.

DETAILED EXAMPLES

A new approach is disclosed for computer representation/ modeling of geometric shapes including a new method for solid modeling (i.e., creating computer-based representations of three-dimensional solids) and associated methods for the fundamental operation of solid modeling: point membership classification, i.e., determining whether any particular point is inside, outside, or on the surface of the solid. This new method of modeling, referred to as "wavelet f-reps," employs wavelets as the basis for interpolating a grid of signed distance function values to produce a function-based representation (f-rep, or implicit solid model) of an associated solid. A means is provided for directly utilizing grids of signed distance function data, which may be obtained using a graph cuts/level set method on volumetric scan data as the basis for a solid model. The wavelet methodology directly endows the models with multi-scale capabilities, and the models can be robustly interrogated using standard methods for wavelet analysis, synthesis and differentiation (via connection coefficients) combined with interval analysis.

The present method provides a direct means to employ the grid of SDF data as the basis for solid modeling without the need for polygonization. Since polygonization is also still considered the standard first step for rapid prototyping (e.g., layered manufacturing or additive fabrication), the invention additionally provides a streamlined process for producing physical prototypes from grids of SDF data.

In an embodiment of the method, the method is operated by performing computations consisting primarily of list correlations. The grid of signed distance values is employed as the data defining a wavelet approximant/interpolant function that in turn serves as the f-rep for the solid. Wavelets provide a multiscale approach to representing information along with multiscale methods for analyzing information. The information of interest is the grid of signed distance data, and the most immediately relevant wavelets are those with compact support so that the analysis and synthesis operations amount to matrix correlation computations. Thus, the method involves primarily multiplying small subsets of contiguous grid values by a set of known coefficients and summing the results.

Such simple operations comprise the basic necessities of wavelet analysis, i.e., determining the coefficients in the linear combination of wavelet basis functions that corresponds to the data, and the inverse process of wavelet synthesis by which function values are derived from wavelet coefficients.

Actual computing operations come are not required until we manipulate or interrogate (determine properties of) the modeled structure. Computing the specific wavelet interpolant coefficients for the SDF grid involves computing list correlations of the data with a scaling vector along each of the grid directions. Iterating this process progressively coarsens the scale and produces the wavelet coefficients at progressive levels of refinement.

To understand the method, consider a simple example with a 1D grid of data. While there are a variety of wavelet formulations available, a particularly simple and useful choice are the Daubechies wavelets of rank 2 and genus 3 for which the scaling coefficients are:

$a_0 = 0.470467$;
$a_1 = 1.14112$;
$a_2 = 0.650365$;
$a_3 = -0.190934$;
$a_4 = -0.120832$;
$a_5 = 0.0498175$

The list $$\vec{a} = \frac{1}{2}\{a0, a1, a2, a3, a4, a5\}$$

is referred to as the scaling vector.

Wavelet analysis consists of recursively separating out the low frequency and high frequency variations at different length scales. The low frequency components at a particular resolution are computed by performing a list correlation of scaling data with the data array followed by 2:1 decimation, to obtain the data corresponding to the next coarsest level of resolution. The high resolution component is obtained by a similar list correlation and decimation process using the wavelet vector:

$$\vec{b} = \frac{1}{2}\{a5, -a4, a3, -a2, a1, -a0\}$$

The low frequency components comprise the coarsened version of the data and can be subjected to repeated analysis to produce further coarsened versions of the data and associated wavelet coefficients to describe the localized variation at each scale.

The inverse process of synthesis (using the high frequency wavelet coefficients to reconstruct the data at higher levels of refinement) happens by a very similar process of list correlations. The only modifications involve changes of position and sign of the scaling coefficients and interlacing (as opposed to decimation) of the results.

To make the discussion concrete, consider a specific 1-dimensional array of data values:

$$\vec{x} = \{7,6,5,4,3,2,1,0,-1,-2,-3,-4,-5,-6,-7,-8,-7,-6,-5, -4,-3,-2,-1,0,1,2,3,4,5,6,7,8\}$$

Therefore, in this simple example, the 1D grid of values has 32 entries shown graphically in FIG. 1.

To perform one stage of wavelet analysis on this data, we compute inner products of the scaling vector with sublists of contiguous data values starting at the odd positions in the list. Thus the first entry in the low frequency component of the data is:

$$(\tfrac{1}{2})\{7,6,5,4,3,2\}\cdot\{a0, a1, a2, a3, a4, a5\} = 6.1826.$$

The second entry is:

$$(\tfrac{1}{2})\{5,4,3,2,1,0\}\cdot\{a0, a1, a2, a3, a4, a5\} = 4.1826.$$

Continuing through the list, the low frequency components comprise the following list with half as many entries as at the original level of refinement:

lowFreqComponent={6.1826, 4.1826, 2.1826,
 0.182599, −1.8174, −3.8174, −5.8386, −7.71213,
 −6.1826, −4.1826, −2.1826, −0.182599, 1.8174,
 3.8174, 5.8386, 7.71213}

Figure 2:
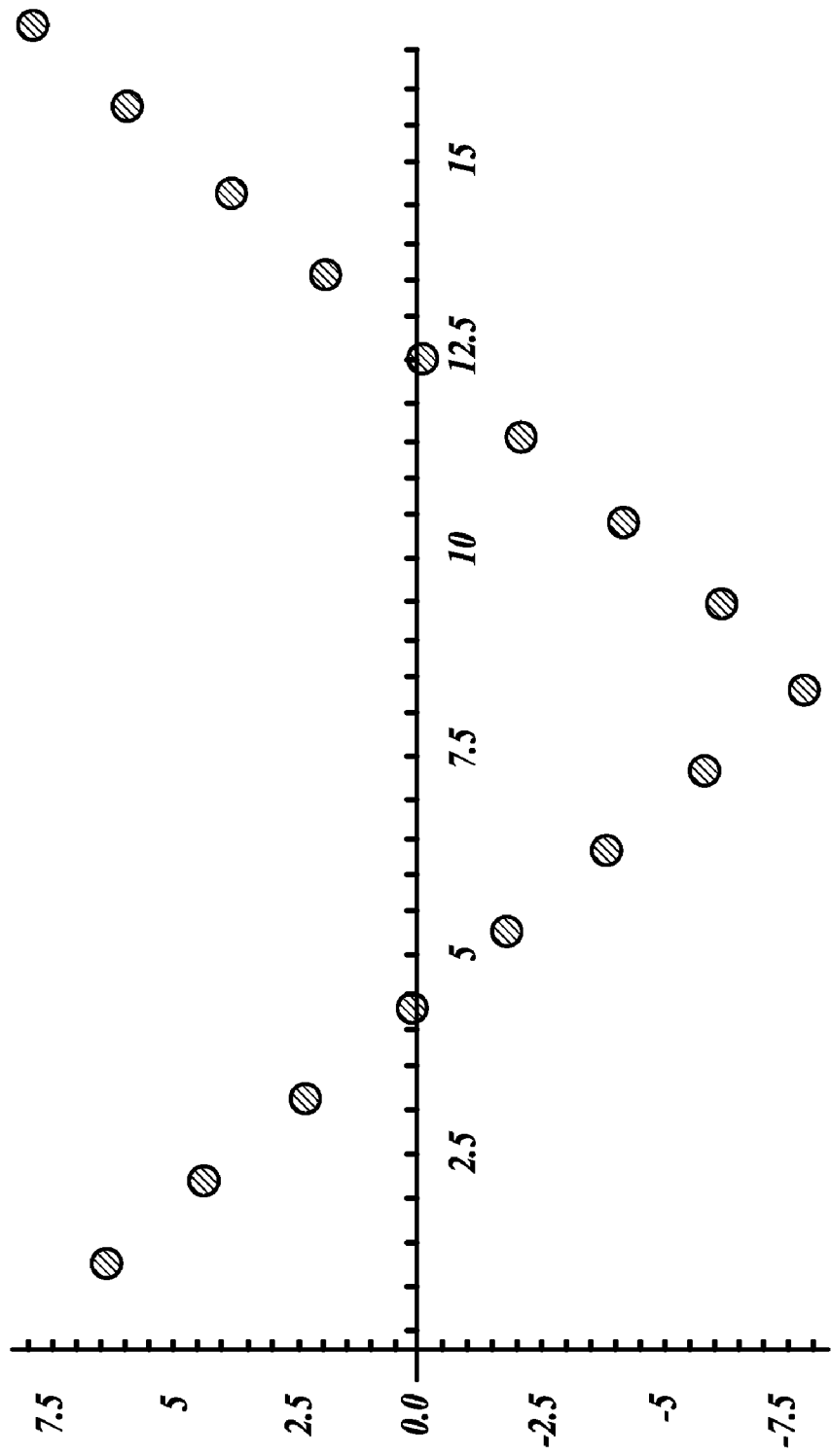
FIG. 2 shows a plot of a coarser version of the data, obtained by applying one stage of wavelet analysis on the data in FIG. 1.

Plotting this list reveals a shape that mimics the graph of the original list, so the low frequency component produces a coarser version of the original data, as shown in FIG. 2.

Similarly, list correlations of ($\tfrac{1}{2}$) {a5, −a4, a3, −a2, −a1, a0} with subsets of the data produces the high frequency component list, and the procedure can be repeated to produce successive levels of coarser representations along with further coefficients to describe the structure "wiped out" during the coarsening process.

The final result from a complete wavelet analysis of the data is as follows:

wavelet Coefficients={$82.22045 \times 10^{-16}$, −4.61677,
 −0.135782, 0.135782, 0.375621, 0.376883,
 −0.375621, −0.376883, $-8.32667 \times 10^{-17}$,
 −0.0368572, 0.245697, 0.136627, $8.32667 \times 10^{-17}$, 0.0368572, −0.245697, −0.136627,
 $5.55112 \times 10^{-17}$, $1.66533 \times 10^{16}$, $-5.55112 \times 10^{-17}$,
 $-2.77556 \times 10^{-16}$, $-3.88578 \times 10^{-16}$, $7.21645 \times 10^{-16}$, 0.200183, 0.0498175, $-5.55112 \times 10^{-17}$,
 $-1.66533 \times 10^{-16}$, $5.55112 \times 10^{-17}$, $2.77556 \times 10^{-16}$,
 $3.88578 \times 10^{-16}$, $7.21645 \times 10^{-16}$, −0.200183,
 −0.0498175} where the first entry is the coarsest representation (i.e., the mean of the data) and the final sixteen entries are the highest frequency (finest scale) wavelet coefficients described above. This list of wavelet coefficients provides a complete alternative representation of the data, because we can systematically re-synthesize the data using the wavelet coefficients. Again the process involves list correlations, but now the relevant vector for synthesizing the low frequency components at the next level of refinement is {a4, a1, a2, a3, a0, a5} while the vector for synthesizing high frequency components is {a5, −a0, a3, −a2, a1, −a4}. From the wavelet Coefficients above, the synthesis process produces the following result:

{7, 6, 5, 4, 3, 2, 1, $-4.996 \times 10^{-16}$, −1, −2, −3, −4, −5,
 −6, −7, −8, −7, −6, −5, −4, −3, −2, −1, $4.996 \times 10^{-16}$, 1, 2, 3, 4, 5, 6, 7, 8} which reproduces the original data (at least to within round off that appear when the exact original value was zero).

So far, we have seen the general result that wavelet analysis provides a simple and direct means (requiring only list correlations with specified vectors) for producing finer and coarser representation of lists of data (or any sampled signal or function) by separating and localizing low frequency and high frequency components.

Now consider what is not general about our choice of both data and wavelet. In particular, the data set chosen is clearly not random; it was constructed by discretely sampling the signed distance function describing the ID interval [8, 24]. As with any SDF for a finite collection of ID intervals, the graph consists of a collection of linear segments with slope +/−1.

Note that derivative estimates can also be computed directly from the sample data. Again the process involves a simple list correlation of the data with a vector, but now the vector consists of connection coefficients rather than scaling coefficients. The results accurately reproduce the derivative away from slope discontinuities and the edges of the computing space (where data padding may be needed).

The choice of Daubechies wavelets was also not accidental. Daubechies wavelets possess the "vanishing moments" property which means that polynomials up to a given degree can be synthesized exactly from a finite sampling. In this setting, Daubechies wavelets of genus 3 can be used to exactly synthesize ID SDFs because the ID SDFs are piecewise linear.

Moreover, piecewise linear SDFs have no significant structure at fine resolutions, and we can see this property in the wavelet analysis example above since 14 of the 32 wavelet coefficients are very small. Replacing the 14 small coefficients with zeros, we achieve almost 50% data compression, and the ensuing synthesis result is essentially indistinguishable from our prior synthesis result.

Putting these pieces together, we obtain a wavelet-based method for employing discretely sampled values of the signed distance function as a model for intervals (i.e., 1D "solids"). Discrete samples of general f-reps (or implicit solid models) could be problematic because the functions may have significant variations between sample points. However, SDFs are well behaved. Everywhere the gradient exists, it has unit magnitude so interval valued versions that bound the evaluation error are directly available based on the sample spacing. It will be appreciated that locations where the gradient magnitude estimate differs significantly from unity are candidates for skeletal grid points (e.g., points nearest the medial axis).

So to recap what we have seen so far:
(1) f-reps (or implicit functions) can be used to represent geometric objects.
(2) SDFs are very well-behaved f-reps that can be fully synthesized from sampled values.

Wavelet f-reps, therefore, allow us to employ sampled values of the SDF as a modeling representation that provides automatic support for multi-scale analysis and data compression.

In some sense, the question to answer in going from sampled values to a full SDF is "How do you evaluate the SDF in between the points where sampled values are provided?" The good news is that there are 3 ready answers to this question. The theoretical answer is the "vanishing moments" conclusion that the behavior of a SDF can be fully synthesized from samples. The interval analysis answer is that, because the SDF changes at unit rate, the value at any point is the value at the nearest sample point +/− the distance to the sample point (and such simple evaluations are often sufficient). The wavelet analysis answer is that if we assume the sampling was at a scale sufficiently fine as to capture the relevant information, we can assume that the finer resolution wavelet coefficients are negligibly small and synthesize finer samplings of the SDF until we attain desired accuracy (provided by the interval analysis approach).

So the remaining question is how to extend this approach to higher dimensions, and again a straightforward answer is available. In two or more dimensions, we can apply a 1D wavelet analysis sequentially along each Cartesian coordinate axis to produce the equivalent of a multi-dimensional tensor product wavelet. While other options are available, the tensor product approach is employed in the current embodiment and produced the included examples.

The details of extending the one-dimensional analysis are described in some detail by the present inventors in *Wavelet SDF-REPS: Solid Modeling with Volumetric Scans*, Proceedings of the 2007 ASME International Design Engineering Technical Conferences, EDETC07, 33rd Design Automation Conference, Sep. 4-7, 2007, LasVegas, Nev. USA, which is hereby incorporated by reference in its entirety.

In multi-dimensional settings, there are two basic differences: the data sets tend to be larger (so compression can be a more significant issue) and the SDF, while not everywhere linear, is still nicely behaved.

To illustrate higher dimensional operation, a 3D example is shown in FIGS. 3A-3D of images of a wavelet f-rep model of a talus (a bone in the foot). The bone was volumetrically scanned to obtain a 128×128×128 grid of intensity values. An level set method was employed to produce a 128×128×128 grid of SDF values, as discussed in the incorporated application. The grid of SDF values together with a wavelet specification (Daubechies wavelets of rank 2 and genus 3) comprises the wavelet f-rep model of the talus, so a solid model is obtained without having to perform any additional computations.

Computations become relevant when we interrogate the model by evaluating its properties. Interrogation can include, for example, computing the volume or surface area (or other integral properties), performing point membership classification, or visualization of the modeled talus.

All of these operations are supported by wavelet f-reps, but we select visualization as the most useful example for exposition, and we choose to visualize using the standard technique of raycasting. Raycasting essentially reverses the physics of sight: rather than receiving and analyzing the light rays that bounce off the object to reach our viewpoint, we construct an image of an object by sending out one or more rays from our viewpoint in the direction corresponding to each pixel. When the ray hits the surface of the object, we compute the shading for the given pixel. While sophisticated shading models exist, here we employ a simple diffuse reflection model in which the shading depends on the angle between the surface normal and the lighting direction. In geometric terms, creating an image of the object involves repeatedly locating the closest surface point in a given direction and computing the vector normal to the surface at that point. In f-rep terms, these operations correspond to computing roots and derivatives of the function that defines the object. While such operations can be problematic with general classes of functions, they are extremely straightforward with wavelet f-reps largely because of the nice properties of SDFs. The first root in a direction can be found by simply marching along with stepsize determined by the magnitude of the function value at the current location. Derivatives are evaluated by list correlation with the appropriate connection coefficients.

Figure 3A:
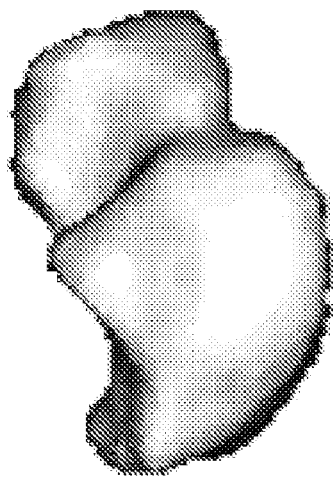
FIG. 3A is a 128×128 pixel image of the talus obtained by applying the present method.

A 128×128 pixel image of the talus obtained by applying this approach is shown in FIG. 3A.

Figure 3B:
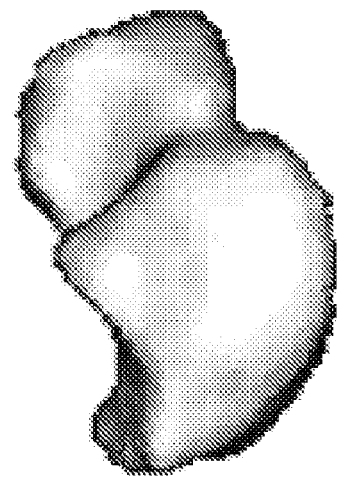
FIG. 3B-3D show images produced from compressed subsets of the data in FIG. 3A, with compression factors from 3.3 to 50.
Figure 3C:
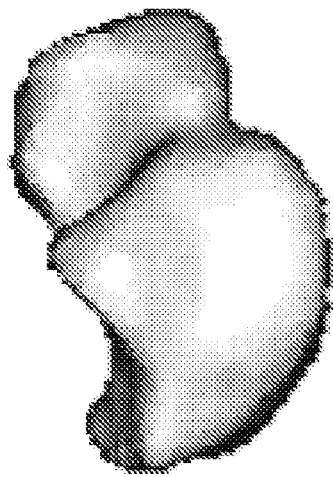
Figure 3D:
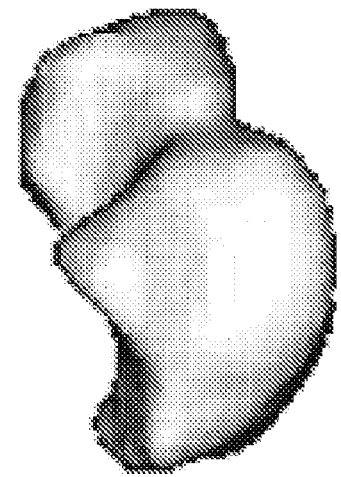

For the other images, wavelet analysis was performed and small coefficients were removed to illustrate the capability for effective data compression. FIG. 3B was produced by zeroing out 70% of the coefficients (all those whose magnitude was less than 0.0001) to produce a compression factor of 3.3. FIGS. 3C and 3D were produced suppressing coefficients less than 0.001 and 0.01, respectively, leading to compression of 90% and 98% or compression by a factor of 10 and 50, respectively.

Figure 4A:
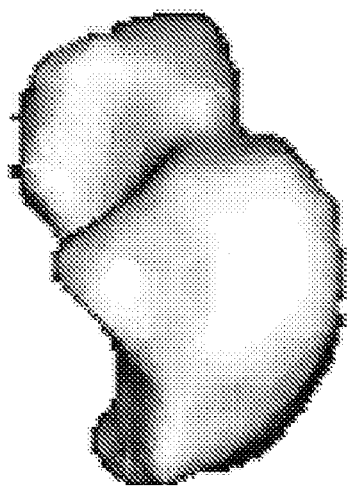
FIGS. 4A-4D illustrate the multi-resolution modeling property of wavelet f-rep for a talus, all derived from the same set of 128×128×128 SDF array of data.
Figure 4B:
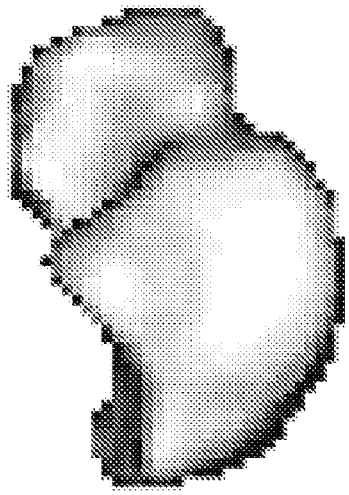
Figure 4C:
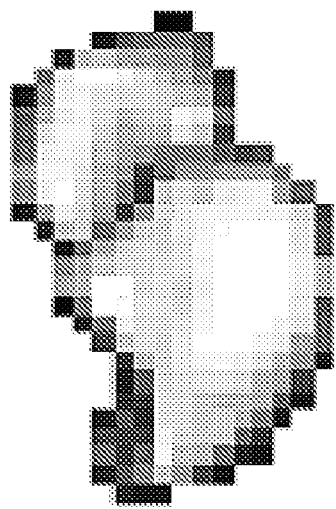

To illustrate the multi-resolution property, the same visualization method can be applied to the data at various levels of refinement. FIGS. 4A-4D show images of the talus all derived from the same 128×128×128 array of SDF data. The 128×128 image obtained by raycasting the f-rep at the scanner resolution is shown in FIG. 4A. In FIGS. 4B and 4C, coarser images are shown. Performing one wavelet analysis step (1 level transform) we obtain a data array of size $64^3$ and the 64×64 image is shown in FIG. 4B. A second analysis step produces a data array of size $32^3$ and the corresponding 32×32 image is shown in FIG. 4C.

Figure 4D:
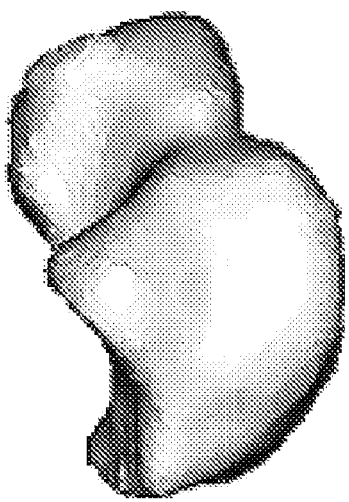

FIG. 4D is perhaps more interesting as it is a 256×256 image; i.e., the resolution is finer than that of the original data. The image was constructed by padding the original data set with zeros (corresponding to the assumption that the scan is performed at a fine enough scale to pick up relevant details so no significant structure should be present at this finer scale) and performing one synthesis step to obtain a refined ($256^3$) data set for raycasting.

As mentioned above, there is a broad range of interrogation operations including evaluation of surface and volume integrals and point membership classification (which is done directly by evaluating the wavelet interpolant); and all of these operations are supported by wavelet f-reps. Moreover, it is worth emphasizing that all of these operations can be performed without ever creating a polygonized approximation of the surface of the object. Freedom from polygonization is perhaps most relevant in the context of rapid prototyping or additive fabrication where physical parts are constructed from computer models using a layer-by-layer process. Currently, such systems take as standard input a polygonized approximation of the object that must be sliced to determine the geometry of each layer. The resulting polygonal descriptions can become very large, and both polygonization and slicing are potential sources of failure of the build process. Wavelet f-reps provide a direct approach to evaluating layer geometry without having to create and slice a polygonal approximation that can introduce errors, consume storage, and compromise build reliability.

Example Method for Modeling Bones with Pins

As discussed in the background section above, combining models wherein one or more of the models comprises a complicated geometry, can be computationally challenging using conventional CAD representations. For example, attempting to combine pins into complex bone models to facilitate 3D printing or rapid prototyping of anatomical joints is computationally difficult. In particular, the final operation of uniting the bone models with the pin models turns out to be troublesome.

Using the method describe above, this task can be accomplished as follows, with reference to a specific foot joint, for expository purposes:

1) Obtain a grid of signed distance values for the talus, preferably using the graph cuts/level set segmentation algorithm applied to 3D image scanner data, as discussed above.

2) Similarly, obtain signed distance values for the calcaneus on the same grid.

3) Identify a point interior to each bone to be a terminal point of the pin. Any point where SDF has a negative value will suffice. For example, the grid point with the smallest signed distance value interior to each bone may be identified as a pin terminal point.

4) Compute a grid of signed distance values for the pin. As is well-known in the art, there are a variety of algorithms (surveyed in Jones, et al.) for computing signed distance values for conventional b-rep solid models, so a CAD modeler can be used to create a model of the pin and the signed distance values can then be computed on the grid of points. Alternatively, we constructed an implicit (f-rep) model of the pin and performed a "virtual volumetric scan" by evaluating the f-rep on the grid of points.

5) Perform the grid-based operation corresponding to the union of the pin and the bones; i.e. at each grid point take the minimum signed distance value from the data for the pin, the talus and the calcaneus. The result corresponds to the grid of signed distance values for the union of the pin, talus and calcaneus except in subsets of the region where the pin overlaps one of the bones. Starting with the signed distance values not in the overlap region as given initial values, apply a level set method to compute corrected signed distance values in the overlap region to complete the grid of signed distance values for the union of pin and bones.

6) Compute list correlations with specified coefficient vectors corresponding to the chosen wavelets to evaluate the SDF at points within the scan region but not on the grid or derivatives of the SDF at points within the scan region. For example, an image of the union of pin and bones can be created by ray-casting which involves computing intersections of rays from a chosen viewpoint with the zero level set of the SDF (i.e., root-finding along the ray) and evaluating the inner product of the normalized gradient of the SDF with a unit vector along the ray. The bound on the magnitude of the gradient of the SDF supports efficient root-finding and the derivatives that appear in the gradient are well approximated by list correlations with (possibly refined) signed distance values.

Additional details regarding the implementation of a wavelet f-rep to this example problem is presented by the present inventors in *Artifact vs. Anatomy: Dealing with Conflict of Geometric Modeling Descriptions*, Proceedings of the SAE Human Modeling Conference, Paper #2007-01-2450, Seattle, Wash., 2007, which is hereby incorporated by reference in its entirety.

Standard CAD Operations on Grids of Signed Distance Values

We now discuss various standard CAD Operations that may be implemented on a grid of signed distance functions.

Given two solids, A and B, and a specified uniform grid of points, r[i,j,k], and the signed distance values for each solid, $d_A[i,j,k]$ and $d_B[i,j,k]$, specify the operation on the signed distance values at a specified grid point to create at least part of the grid of signed distance values that, along with the wavelet approximant specification, constitute the wavelet SDF-rep for the solid produced by the CAD operation. In some cases, some portions of the grid must be corrected by performing a level set procedure, and the criterion for specifying the region needing correction is given.

1. Complement: $\neg A$ $$d_{\neg A}[i,j,k] = -d_A[i,j,k]$$

Note that this is a unary operation (i.e., it involves a single solid) that may produce an unbounded "solid".

2. Intersection: $A \cap B$ $$d_{A \cap B}[i,j,k] = \mathrm{Max}[d_A[i,j,k], d_B[i,j,k]]$$

Level set correction may be required on a subset of the exterior grid points where:

$d_{A \cup B}[i,j,k]>0.$

3. Union: A∪B $d_{A \cup B}[i,j,k]=\text{Min}[d_A[i,j,k],d_B[i,j,k]]$

Level set correction may be required on a subset of the interior grid points where:

$d_{A \cup B}[i,j,k]<0.$

4. Difference or Cut: A−B=A ∩ (¬B)

$d_{A-B}[i,j,k]=\text{Max}[d_A[i,j,k],-d_B[i,j,k]].$

Level set correction may be required on a subset of the exterior grid points where:

$d_{A \cup B}[i,j,k]>0.$

5. Translation, rotation, scaling:

Apply inverse transformation from desired grid and evaluate wavelet approximant to desired accuracy. Apply level set method to compute signed distance values at grid points that correspond to points outside the region corresponding to the original grid.

A new method for solid modeling based on wavelet interpolation of grids of signed distance function values (wavelet f-reps or SDF-reps). The wavelet f-rep formulation is motivated by, and well suited for, modeling of organic shaped derived from volumetric scan data. However, wavelet f-reps are also capable of modeling artifacts designed by conventional CAD systems, as discussed above. The nature of SDFs, well behaved functions that are locally very well approximated by low degree polynomials and have unit magnitude gradient away from exceptional points near the boundaries of Voronoi regions, makes them very amenable to wavelet analysis. Basic wavelet operations of analysis, synthesis, and differentiation provide immediate support for useful modeling capabilities including data compression, multi-resolution representation, and skeletal-based solid editing. Using the wavelet f-rep formulation, modeling operations including visualization, Boolean operations, skeletal editing, and computation of internal and surface properties can all be performed directly on the grid of SDF data without ever producing surface triangulations.

Other Applications

Although the present invention has been described largely in the context of data obtained through conventional medical imaging technologies such as magnetic resonance imaging, computed tomography, positron emission tomography and the like, there is nothing in the disclosure that is specific to such applications. Voxel-based data may be acquired in a number of other applications and other modalities, including for example sonogram and other sound-based imaging, x-ray imaging, and optical imaging. In addition, although three spatial dimensions are discussed, the method is readily extended to additional dimensions, for example for analyzing time-varying data.

While illustrative embodiments have been illustrated and described, it will be appreciated that various changes can be made therein without departing from the spirit and scope of the invention.

The invention claimed is:

1. A method for modeling geometrically complex objects comprising the steps of:

obtaining voxel-based image data of a three-dimensional region wherein the image data includes an image of a three-dimensional object having a surface and storing the voxel-based image data on a computer;

segmenting the voxel-based image data using a graph-cuts method, and then refining the segmentation using a level set method, wherein the segmentation output comprises a grid of points, each point having a signed distance value, and wherein the magnitude of the signed distance value represents the shortest distance to the surface of the three-dimensional object;

using wavelets to interpolate the signed distance values between points on the grid and to generate a function-based representation of the object;

storing at least one of the grid of signed distance values and the function-based representation of the object onto a computer readable media.

2. The method of claim 1, wherein the voxel-based image data comprises anatomical image data.

3. The method of claim 1, wherein the voxel-based image data comprises image data obtained from one of computed tomography, magnetic resonance imaging and positron emission tomography.

4. The method of claim 1, wherein the wavelets comprise Daubechies wavelets.

5. The method of claim 1, further comprising the steps of obtaining a second signed distance value grid of points for a second three-dimensional object, performing a grid-based operation to form a union of the three-dimensional object with the second three-dimensional object by partially overlapping the signed distance value grid of points with the second signed distance value grid of points, and applying a level set method to compute corrected signed distance values in the overlapping portion of the signed distance value grids.

6. The method of claim 1, further comprising the step of performing at least one wavelet analysis step to compress the data prior to storing the grid of signed distance values.

7. The method of claim 1, wherein the step of using wavelets to interpolate the signed distance values comprises applying a one-dimensional wavelet analysis sequentially along each coordinate axis.

8. The method of claim 1, further comprising the step of synthesizing signed distance values on a grid that approximately describe the object from the function-based representation of the object.

9. The method of claim 1, further comprising identifying points in the grid of points having signed distance values that indicate candidates for skeletal grid points.

10. The method of claim 1, further comprising the step of manipulating the signed distance values on the grid of points to perform a CAD operation.

11. The method of claim 10, further comprising the step of obtaining a second signed distance value grid of points for a second three-dimensional object, and wherein the CAD operation is selected from the set consisting of complement, intersection, union, difference and translation.

12. A method for creating a function-based representation of an object imaged in a volumetric scan data set comprising the steps of:

obtaining a volumetric scan data set of a three-dimensional region and storing the volumetric scan data set on a computer;

segmenting the scan data set using a graph-cuts method, and then refining the segmentation using a level set method to identify a three-dimensional object imaged in the scan data set, wherein the segmenting produces a three-dimensional grid of signed distance values representing an outer surface of the object;

using wavelet analysis on the grid of signed distance values to generate a function-based representation of the object;

storing the function-based representation of the object on a computer readable media.

13. The method of claim 12, wherein the three-dimensional object is an anatomical structure.

14. The method of claim 13, wherein the anatomical structure is a bone.

15. The method of claim 12, wherein the wavelet analysis comprises one-dimensional wavelet analysis applied sequentially along each coordinate direction.

16. The method of claim 12, wherein the wavelet analysis utilizes Daubechies wavelets.

17. A method for creating a function-based representation of an n-dimensional object imaged in a scan data set comprising the steps of:

obtaining a volumetric scan data set of an n-dimensional region and storing the volumetric scan data set on a computer;

segmenting the scan data set using a graph-cuts method, and then refining the segmentation using a level set method to identify an n-dimensional object imaged in the scan data set, wherein the segmenting produces a grid of signed distance values representing an outer surface of the object;

using wavelet analysis on the grid of signed distance values to generate a function-based representation of the object;

storing the function-based representation of the object on a computer readable media.

18. The method of claim 17, wherein the n-dimensional object comprises an anatomical structure.

19. The method of claim 17, wherein the wavelet analysis comprises one-dimensional wavelet analysis applied sequentially along each coordinate direction.

20. The method of claim 17, wherein the wavelet analysis utilizes Daubechies wavelets.

* * * * *